April 29, 1930. A. W. MORTON 1,756,905
PISTON RING
Filed Oct. 11, 1929
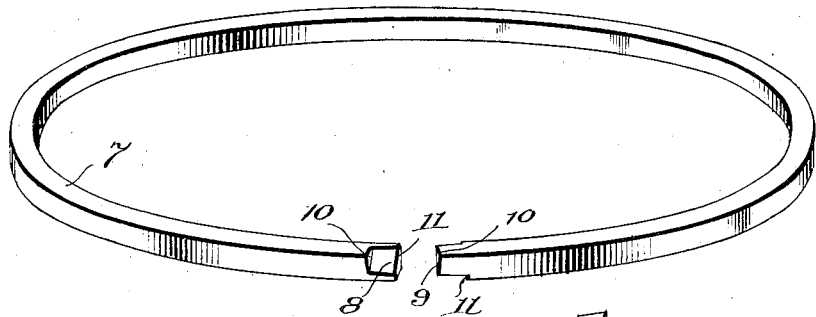
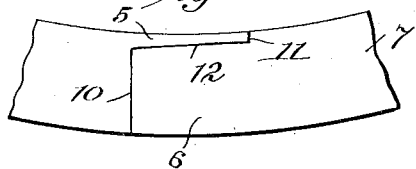
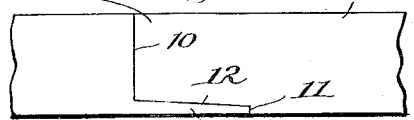
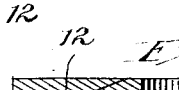
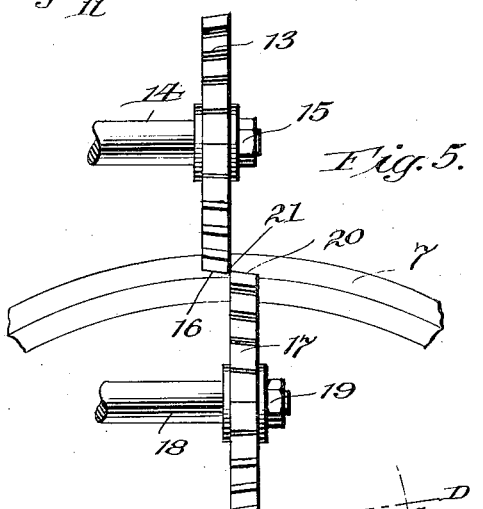
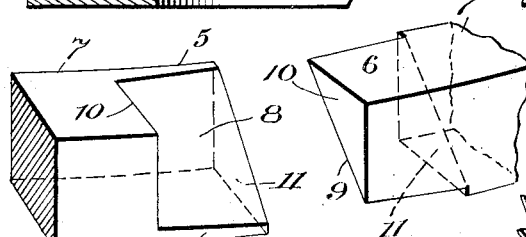
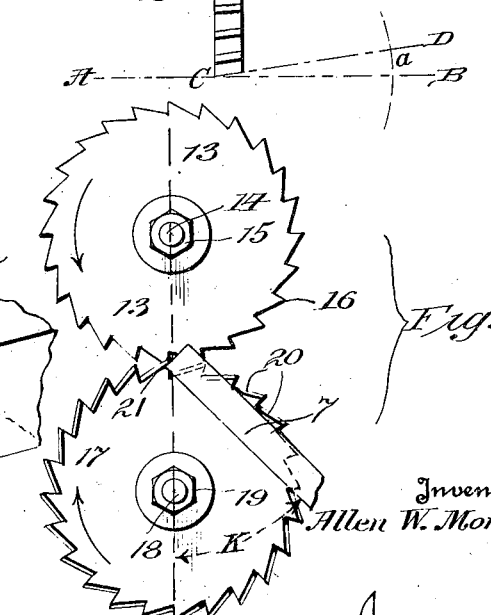
Inventor
Allen W. Morton Patented Apr. 29, 1930

1,756,905

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON RING

Application filed October 11, 1929. Serial No. 398,983.

My invention relates to piston rings and particularly to a method of forming the joints in such rings.

Piston rings of the stepped type are known, and it is also known in the art to cut the steps diagonally. A joint of the latter type is shown in the United States patent to J. S. Raworth, No. 615,902, granted December 13, 1898, the joint being formed by two radial cuts connected by a conical cut. In making joints of this type it is necessary to use milling cutters having their cutting faces of such a radius that the contacting surfaces of the steps are arc-shaped and have the same radius of curvature as that of the cylinder in which the ring is to be used. Such a construction produces a tight seal even when the cylinder and ring become worn, because, as the joint opens, the surfaces of the steps remain parallel to each other, but it is necessary that a separate pair of milling cutters be provided for each size of ring. A method of forming joints of this character is disclosed in the United States patent to Dunham No. 1,269,409, June 11, 1918. Cutters of the type disclosed in this patent are difficult and expensive to make so that the cost of producing rings with joints of this character is prohibitive.

It has also been proposed to form the stepped surfaces plane with the legs straight throughout their extent, in order to make it possible to use one set of milling cutters for several ring sizes. This construction is not satisfactory because when the ring becomes worn or is placed in an oversize cylinder, a wedging action takes place, forcing one end of the ring away from the cylinder wall and causing excessive leakage. This result is due to the fact that as the ring joint opens, the surfaces of the steps do not remain parallel to each other, hence one of the steps is forced inwardly away from the cylinder wall.

I have found by experiment that a diagonally stepped joint having substantially all of the advantages of the Raworth construction can be made cheaply and easily by passing a closed ring between overlapped milling cutters having their cutting faces inclined with respect to their axes, so as to form plane stepped surfaces on the legs of the joint, these legs tapering toward their free ends so that one leg is pentagonal and the other triangular in cross section. The angle at which the cutters are inclined can be calculated from the dimensions of the ring.

In order to have the joint open on a line coinciding as nearly as possible with the arcuate line of opening of the Raworth joint it is necessary that this taper be slight, and hence the angle of inclination of the cutters must be slight. For angles of the magnitude in question, the natural sines and tangents do not differ much in value, but to be strictly accurate I prefer to make this angle such that its natural sine is substantially equal to the ratio of the length of one of the legs of the joint to the ring diameter. When a ring joint is cut with the tapered legs embodying this mathematical relation, the joint will open freely with no wedging action, and yet the plane surfaces of the legs will maintain such accurate alignment that the sealing action is practically as effective as that which can be obtained with the much more expensive Raworth construction.

One embodiment of my invention is shown in the accompanying drawings, in which:—

Fig. 1 is a perspective view of a piston ring having a diagonally stepped joint made in accordance with my invention.

Fig. 2 is a top plane view of the ring joint as it appears in closed position.

Fig. 3 is a view in side elevation of the ring joint in closed position.

Fig. 4 is an enlarged perspective view of the ring joint.

Fig. 5 is an elevation of the cutters employed in forming a stepped joint in accordance with my invention and showing a ring in the process of being cut.

Fig. 6 is a view in elevation taken from the right of Fig. 5 showing the angular relation of the ring to the cutters.

Figs. 7, 8 and 9 are sections taken through ring joints made in accordance with my invention and illustrating how the inclination of the meeting faces of the legs is varied according to the ring cross sections.

Similar reference characters refer to similar parts in each of the several views.

The reference character 7 designates a split piston ring of conventional type as employed in internal combustion engines, and having a stepped joint. This joint is made up of two legs 5 and 6 having plane cooperating surfaces 8 and 9 respectively, defined by radial cuts of substantial width, the sides of these cuts being designated 10 and 11, respectively. When the ring is contracted to fully close the joint, the surfaces 8 and 9 are in close contact, as shown in Figs. 2 and 3. The plane surfaces 8 and 9 are inclined in such manner as to trace a line on one plane face only of the ring, this line being inclined to the sides of the cuts and to the tangent to the periphery of the ring at the joint. Thus one leg of the joint is pentagonal in cross section and the other triangular. By making the joint in this manner no knife edges are formed on leg 5, either on the plane faces of the ring or on the inner or outer circumference of the ring. Hence, when the complementary leg 6 overlaps leg 5, leaving a space between sides 10 and 11 of the radial cuts, blow-bys at the joint are prevented, because any fluid that enters between the sides 10 is prevented from escaping to the rear of the ring by the upper portion of leg 5, and is also prevented from escaping past the periphery by the lower portion of leg 5, as shown in the drawing.

By reference to Figs. 2 and 3, the inclined character of the cooperating surfaces 8 and 9 will be seen. The line of contact of these surfaces is indicated in these figures by the reference character 12, and its angular position is determined by the angle of inclination of the cutting faces of milling cutters 13 and 17.

The mechanism for cutting the joint is indicated in Figs. 5 and 6. As shown in these figures, milling cutter 13 is secured on shaft 14 by a nut 15 and has its cutting surface 16 inclined at a small angle with respect to the axis of the cutter. In a like manner, the cutter 17 is secured to shaft 18 by nut 19 and has an inclined cutting surface 20. These cutters are placed in slightly overlapping relation at 21 with their cutting surfaces in substantially parallel relation at this point. The angle of inclination of the cutting faces is designated $a$, and is determined by the ratio of the thickness of a cutter (the same as the length of a leg) to the diameter of the ring to be cut. If the line ACB designates the axis of the cutter 17, then the angle $a$ is determined by the inclination of line C D, and for average sized rings this angle is between 2° and 3°. The cutters 13 and 17 are rotated by any suitable means, not shown.

When a closed ring is to be cut to produce a diagonally stepped joint, the angle $a$ having first been determined by calculation, the ring 7 is tilted to the position shown in Fig. 6 and while being held at the desired angle by any suitable means is brought into contact with the rotating cutters 13 and 17. The angle between the plane defined by the cutter axes and one plane of the ring is designated K and is determined by the ring cross section. The cutter 13 cuts a plane surface 8 bounded by a radial cut 10, the surface 8 being inclined by an amount determined by the inclination of cutting face 16. In like manner, the cutter 17 cuts a plane surface 9 bounded by a radial cut 11, the surface 9 having the same inclination as the cutting face 20 of the cutter 17. As the ring 7 is moved toward the cutters in straight line relation, the cutting faces penetrate deeper and deeper until the two cuts intersect. After this milling operation is completed, the ring can be contracted until the surfaces 8 and 9 meet on the line 12 as seen in Figs. 2 and 3. Tension can now be obtained in the ring by any of the well-known methods, such as peening the inner circumference, or heat treating.

If this method of forming a joint is to be applied to a ring in which tension is obtained by cutting a piece from the ring, and then re-turning the ring to produce perfect circularity, the steps of manufacture may be carried out in the following manner. A piece is first cut from the closed ring, the section removed being of a circumferential length equal to the free gap desired between the extreme ends of the ring. The ring is then closed and inserted in a gauge until the ends touch, the gauge tilted to the proper inclination and the joint is milled as before. The ring is then re-turned after the joint is formed.

With the steps cut in this manner, substantial surface contact will be maintained between the surfaces 8 and 9 for all conditions of the joint between the fully open and fully closed positions, and the gas leakage, as shown by actual tests is reduced by amounts varying from 33 to 70 per cent below that which occurs with rings using other types of joints.

Figs. 7, 8 and 9 illustrate how the angle K, at which the ring to be cut is inclined to the cutter axes is varied in accordance with the ring cross section. In Fig. 7 the line of contact 12 of the surfaces of the legs is shown as inclined at an angle of approximately 45 degrees where the ring cross section is substantially square. Fig. 8 shows the line 12 inclined steeply on a wide ring of very small radial thickness, and Fig. 9 shows it inclined slightly on a narrow ring of great radial thickness. Changes in the angle K are made correspondingly in the rings of other cross sections.

In stepped joints of ordinary construction, the ring is weakened at the intersection of the legs with the body of the ring, so that there is a likelihood of the ring breaking at this point. This is true both of joints having straight legs and those having conical legs of the Raworth type. A stepped joint made in accordance with my invention is, however, stronger because the tapered legs form cantilever sections which are reinforced at the intersection of the legs with the body of the ring.

Not only does this method of making diagonally stepped joints render gas leakage materially less, but it also provides a simple and inexpensive way of producing a superior product. One set of milling cutters can be used for several ring sizes and a tight joint can be produced in any sized ring whatsoever by application of the formula:

$$a = \sin^{-1} \frac{\text{length of a leg}}{\text{ring diameter}}.$$

to the taper of the cutters.

No claim is made herein to the subject matter covering the method of making the joint required to be divided out of this case by the United States Patent Office, such subject matter now appearing in my divisional application Serial Number 440,759, filed April 1st, 1930.

Although I have herein shown and described only one embodiment of my invention, it is obvious that various changes may be made, within the scope of the appended claims without departing from the spirit and scope of my invention.

What is claimed is:—

1. A piston ring having a diagonally stepped joint, the meeting faces of the legs forming said joint being plane surfaces, one of said legs being pentagonal and the other triangular in cross section and both of said legs tapering toward their free ends.

2. A piston ring having a diagonally stepped joint, the legs of said joint having cooperating plane surfaces which define a plane intersecting the peripheral surface of the ring at an angle to the plane faces of the ring, such angle being determined by the ratio of the length of a leg to the ring diameter.

3. A piston ring having a diagonally stepped joint, the legs of said joint having cooperating plane surfaces which define a plane intersecting a plane face of the ring at an angle to a tangent to the peripheral surface of the ring at the joint, said angle being such that its natural sine is substantially equal to the ratio of the length of a leg to the ring diameter.

4. A piston ring having a stepped joint, the meeting faces of the legs of said joint being plane surfaces, one of said legs being pentagonal and the other triangular in cross section, and both of said legs tapering toward their free ends, the amount of said taper being determined by the ratio of the length of one of the legs to the ring diameter.

5. A piston ring having a stepped joint, the meeting faces of the legs of said joint being plane surfaces, one of said legs being pentagonal and the other triangular in cross section, and both of said legs tapering toward their free ends, the angle determining the amount of said taper having a natural sine substantially equal to the ratio of the length of one of the legs to the ring diameter.

In testimony whereof I have signed my name to this specification.

ALLEN W. MORTON.